US008736854B2

(12) United States Patent
Osakabe

(10) Patent No.: US 8,736,854 B2
(45) Date of Patent: May 27, 2014

(54) IMAGE READING APPARATUS CONTROLLING IMAGE READING UNIT IN SET OF OPERATION MODES

(75) Inventor: Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1238 days.

(21) Appl. No.: 11/964,266

(22) Filed: Dec. 26, 2007

(65) Prior Publication Data

US 2008/0151331 A1 Jun. 26, 2008

(30) Foreign Application Priority Data

Dec. 26, 2006 (JP) ................................. 2006-349784

(51) Int. Cl.
*G06F 3/12* (2006.01)
(52) U.S. Cl.
USPC .......... 358/1.13; 358/488; 358/468; 358/474; 358/487; 358/497
(58) Field of Classification Search
USPC .......................... 358/488, 468, 474, 487, 497
See application file for complete search history.

(56) References Cited

U.S. PATENT DOCUMENTS

| 4,666,289 | A | * | 5/1987 | Kawano | 399/14 |
|---|---|---|---|---|---|
| 5,710,967 | A | * | 1/1998 | Motoyama | 399/377 |
| 5,900,950 | A | * | 5/1999 | Hsu | 358/497 |
| 6,734,996 | B1 | * | 5/2004 | Lee | 358/486 |
| 7,022,972 | B2 | * | 4/2006 | Fukatsu et al. | 250/222.1 |
| 7,518,762 | B2 | * | 4/2009 | Budelsky et al. | 358/474 |
| 7,777,920 | B2 | * | 8/2010 | Shoda et al. | 358/474 |
| 2004/0161273 | A1 | * | 8/2004 | Anderson et al. | 399/377 |
| 2006/0245013 | A1 | * | 11/2006 | Ikeno et al. | 358/487 |

FOREIGN PATENT DOCUMENTS

| EP | 0919855 A1 | 6/1999 |
|---|---|---|
| JP | S53-104638 U | 8/1978 |
| JP | S53-119941 U | 9/1978 |
| JP | S57-040968 U | 3/1982 |
| JP | S57-043451 U | 3/1982 |
| JP | S58-111931 A | 7/1983 |
| JP | H05-029040 U | 4/1993 |
| JP | H07-029548 U | 6/1995 |
| JP | H08-069160 A | 3/1996 |
| JP | H11-202426 A | 7/1999 |
| JP | 2002-214977 A | 7/2002 |
| JP | 2004-144832 A | 5/2004 |

OTHER PUBLICATIONS

Japan Patent Office, Decision of Patent Grant for Japanese Patent Application No. 2006-349784 (counterpart to above-captioned patent application), dispatched Aug. 3, 2011.

* cited by examiner

*Primary Examiner* — Benny Q Tieu
*Assistant Examiner* — Martin Mushambo
(74) *Attorney, Agent, or Firm* — Baker Botts L.L.P.

(57) ABSTRACT

One aspect of the invention provides an image reading apparatus including: a document placement portion on which a document is allowed to be placed; a display portion, at least a part of which is transmissive of light; an image reading unit movable along a first direction below the document placement portion and comprising an light emitting unit configured to emit light; and a control unit operable to control the image reading unit in a plurality of operation modes. The plurality of operation modes include a first operation mode that allows the image reading unit to be positioned at a first position corresponding to the display portion and cause the light emitting unit to emit the light, and the display portion is transmissive of the light emitted from the light emitting unit at the first position.

20 Claims, 8 Drawing Sheets

IMAGE READING APPARATUS CONTROLLING IMAGE READING UNIT IN SET OF OPERATION MODES

CROSS-REFERENCE TO RELATED APPLICATIONS

This application is based upon and claims the benefit of priority from Japanese Patent Application No. 2006-349784, filed on Dec. 26, 2006, the entire contents of which are incorporated herein by reference.

TECHNICAL FIELD

One aspect of the present invention relates to a document reading apparatus of the so-called flat bed type for reading a document placed on a document placement table.

BACKGROUND

There is an image reading apparatus of the so-called flat bed type, which reads a document placed on a glass plate fixed to a document placement table with a record surface of the document set downward and includes an image reading unit (image scanner device) configured to scan the document and arranged in a lower portion of the glass plate.

In such an image reading apparatus, it is necessary to place a document in a proper position with respect to the glass plate (image scanner device) in order to correctly recognize a size of the document and read the document. Therefore, a positioning member for guiding a position of the document is arranged in the periphery of the glass plate. The positioning member is generally disposed in a state of slightly upward protruding beyond the glass plate and the side of the document is abutted on the positioning member to perform positioning.

In order to improve operability of positioning, for example, in JP-A-2004-144832, a mark portion for guiding a position to place a document is printed or inscribed on a surface of a positioning member and in addition, a mark portion for guiding a placement position is formed on a glass plate. Plural kinds of mark portions are disposed for documents with different sizes, so that a user can align correctly the document of each size.

However, in the case of the mark portion as shown in JP-A-2004-144832, since the placement is not always performed in sufficiently bright environment, it is difficult to find the mark portion when the periphery is dark and the document cannot be aligned speedily.

On the other hand, JP-A-2002-214977 discloses an image reading apparatus including an arranging light emission device in a positioning member. In the image reading apparatus, when a document is aligned with a glass plate, reference positions (for example, a back side reference for aligning with the corners of the back side of the glass plate, a center reference for aligning with the center, or a front reference for aligning with the corners of the front side) vary depending on models. As a result of that, for example, when a document is aligned by a center reference or a front reference in spite of an apparatus of a back side reference, trouble in which most of the document cannot be read is caused.

Therefore, in JP-A-2002-214977, a reference lamp is disposed as the light emission device in the vicinity of a reference position in the positioning member so that a user can recognize its reference position without making a mistake. Concretely, for example, in an image reading apparatus of a back side reference, when a cover is opened, the reference lamp disposed in the positioning member in the vicinity of a back side reference position lights roundly (see FIG. 2 of JP-A-2002-214977). Consequently, the user can speedily recognize that the apparatus is the apparatus of the back side reference and can place the document on the glass plate without mistaking the reference position.

SUMMARY

For example, when the image reading apparatus adopts a center reference, a center position (center line) of a document is aligned with a reference position and it is difficult to accurately grasp the center line of the document by only making a visual check. Therefore, it is normally constructed so as to align two sides orthogonal to one side of the document with a mark portion disposed in a positioning member while abutting one side of the document on the positioning member.

In JP-A-2002-214977 described above, the reference lamp is used, so that it can be speedily recognized that the reference is a center reference even when environment of the periphery is dark. However, only the reference lamp emits light and the mark portion does not emit light, so that it is difficult to accurately align when the periphery is dark.

Also, in JP-A-2002-214977, a light source is necessary for the reference lamp which is the light emission device (the light source is not described concretely in JP-A-2002-214977) and in addition, multiple light sources are required in the case of attempting to emit light the mark portion. As a result of that, the cost of the image reading apparatus increases and also space for arranging multiple light sources is required.

An object of one aspect of the invention is to provide an image reading apparatus capable of emitting light to the outside of the image reading apparatus while suppressing an increase in cost.

According to an aspect of the invention, there is provided an image reading apparatus including: a document placement portion on which a document is allowed to be placed; a display portion, at least a part of which is transmissive of light; an image reading unit movable along a first direction below the document placement portion and comprising an light emitting unit configured to emit light; and a control unit operable to control the image reading unit in a plurality of operation modes, wherein the plurality of operation modes include a first operation mode that allows the image reading unit to be positioned at a first position corresponding to the display portion and cause the light emitting unit to emit the light, the display portion being transmissive of the light emitted from the light emitting unit at the first position.

DESCRIPTION

Figure 1:
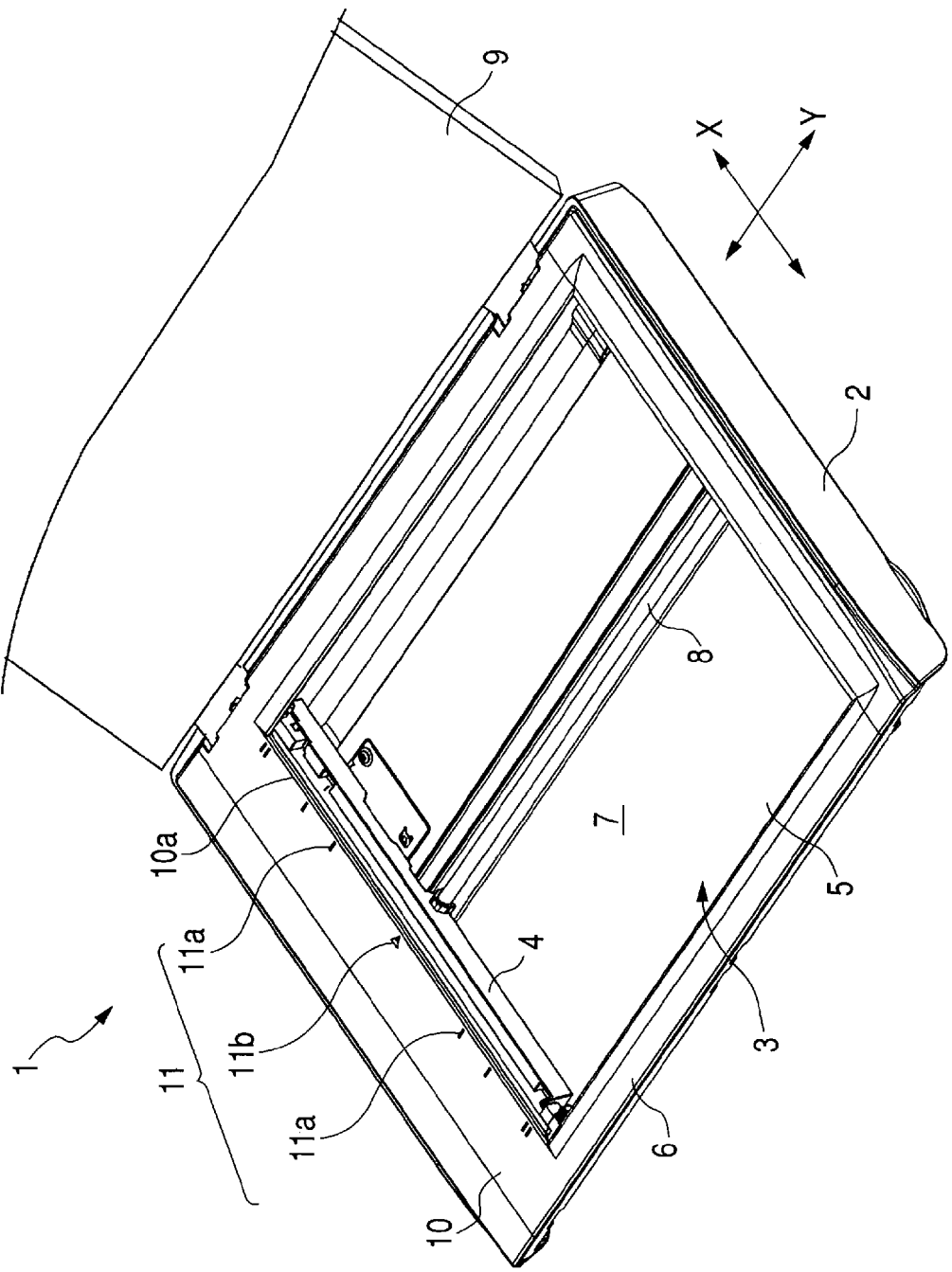
FIG. 1 is a perspective view of a state of opening a cover body of an image reading apparatus according to an embodiment of the invention.

An embodiment of the invention will be described below. FIG. 1 is a perspective view of an image reading apparatus 1. The image reading apparatus 1 may be applied to a single scanner device or may be applied to an image reading unit of a multi function device having plural functions such as a facsimile function, a copy function, a printer function and a scanner function.

In the image reading apparatus 1, a document placement table 3 on which a document is placed is disposed in the upper side of a body case 2, and a CIS (Contact Image Sensor) that is an image scanner device as an image reading unit 4 is movably arranged under the table 3 as shown in FIG. 1.

Figure 8:
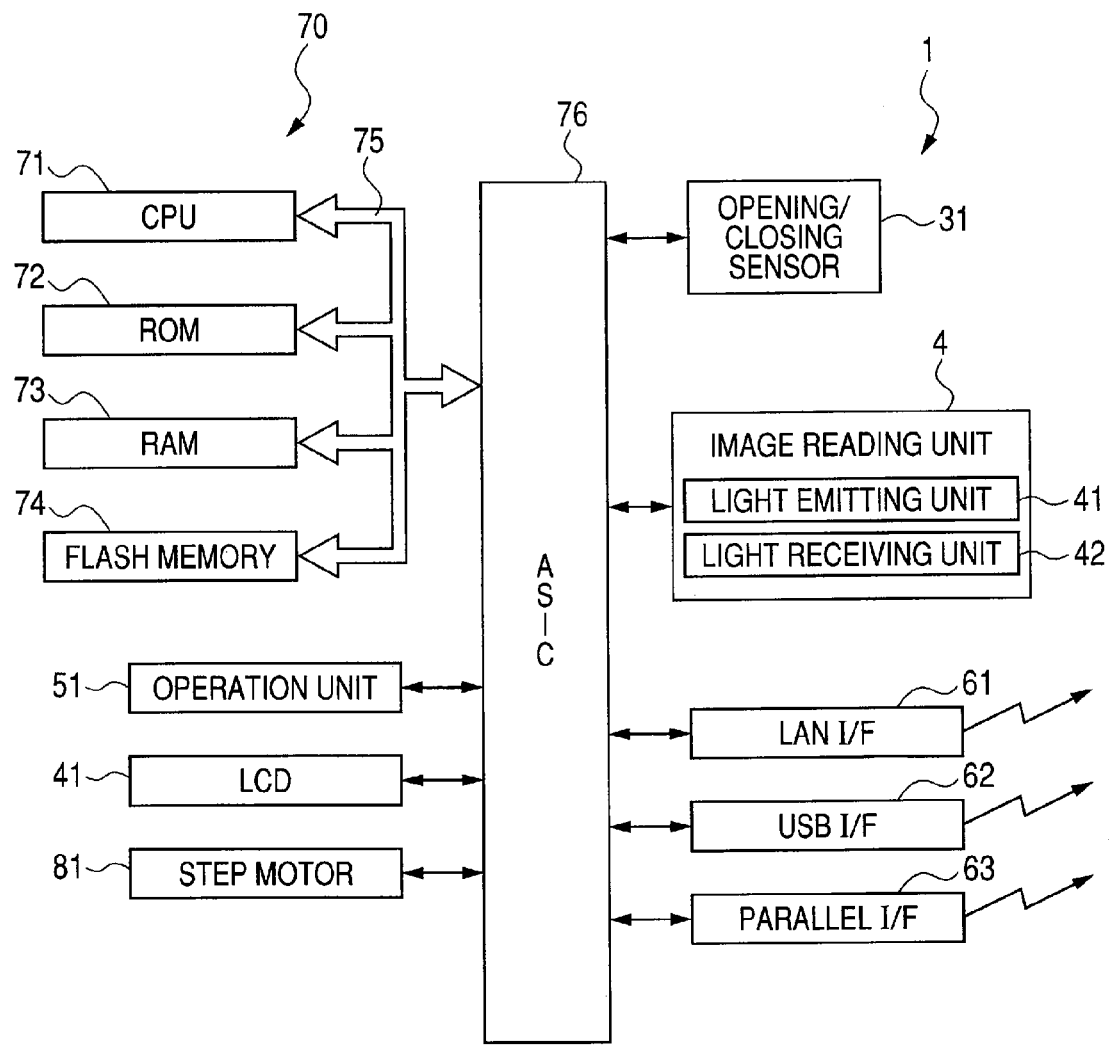
FIG. 8 is a block diagram illustrating an electric configuration of the image reading device.

As shown in FIG. 8, the image reading apparatus 1 includes an ASIC (Application Specific Integrated Circuit) 76 connected to an opening and closing sensor 31, the image reading unit 4, an LCD (Liquid Crystal Display) 41, an operation unit 51, various interfaces (a LAN interface 61, an USB interface 62, and a parallel interface 63), a control unit 70 and a step motor 81.

The control unit 70 is configured by a microprocessor and includes a CPU 71, a ROM 72, a RAM 73 and a flash memory 74, which are connected via a bus 75 to the ASIC 76. The ROM 72 stores a program to be executed by the CPU 71 and data necessary for it (such as operation modes of the image reading unit 4). The RAM 73 functions as a work region when the CPU 71 executes the program. The flash memory 74 is a memory retaining data even after the power turns off and stores various data such as setting data.

The LCD 3 includes a display screen for displaying various kinds of information thereon. The operation keys 4 accept an input from a user for operating the image reading apparatus 1.

The document placement table 3 includes a glass plate 5 (a transparent member), and a frame body 6 with thin plate shape arranged and overlapped over the glass plate 5. In addition, in FIG. 1, members arranged under the glass plate 5 are also displayed by solid lines. Here, the frame body 6 is constructed by combining plural plate-shaped members so that the inner periphery and the outer periphery show a rectangular shape when viewed from the plane, and the portion of the glass plate 5 exposed to the inside of the inner periphery of the frame body 6 in a rectangular shape when viewed from the plane forms a document placement portion 7 on which a document is placed. The frame body 6 is substantially opaque. A direction parallel to a short side of the document placement portion 7 is set in an X-axis direction and a direction parallel to a long side is set in a Y-axis direction.

A frame of the frame body 6 adjacent to one short side (an example of a first side) parallel to the X-axis of the document placement portion 7 is used as a positioning member 10 (an example of a second portion) for positioning a document placed on the document placement portion 7. As a result of that, the positioning member 10 is arranged adjacently to the document placement portion 7. Since the frame body 6 is arranged and overlapped over the glass plate 5, the positioning member 10 upward protrudes beyond the document placement portion 7. A side surface of the side of the document placement portion 7 of the positioning member 10 forms a surface (abutting surface) 10a (an example of a positioning portion) on which a document P at the time of alignment abuts, and is used for positioning of a Y-axis direction of the document P.

The image reading unit 4 arranged under the glass plate 5 is elongated in the X-axis direction, and its length is set in accordance with a reading region of the X-axis direction in the document placement portion 7 and is herein set at about the same length dimension as that of the short side of the document placement portion 7. A shaft portion 8 extending in the Y-axis direction is disposed under the glass plate 5 and near a center line of width of the X-axis direction, and the image reading unit 4 is disposed so as to slide along the shaft portion 8 and reciprocate in the Y-axis direction. The image reading unit 4 is disposed so as to be able to move along a back surface of the positioning member 10 as well as move along a back surface of the document placement portion 7 used as a reading region in order to read the document P.

As shown in FIGS. 1 and 8, the image reading unit 4 includes a light emitting unit 41 for emitting light to a document placed on the glass plate 5, and a light receiving unit 42 for receiving light reflected on the document P. Movement and light emission (lighting) of the image reading unit 4 are controlled by a control unit 70. In this embodiment, the CIS is adopted as the image reading unit 4, and the light emitting unit 41 includes a light source of LEDs of three colors of R (red), G (green) and B (blue), and the light receiving unit 42 includes an image pickup device (C-MOS sensor).

Figure 3:
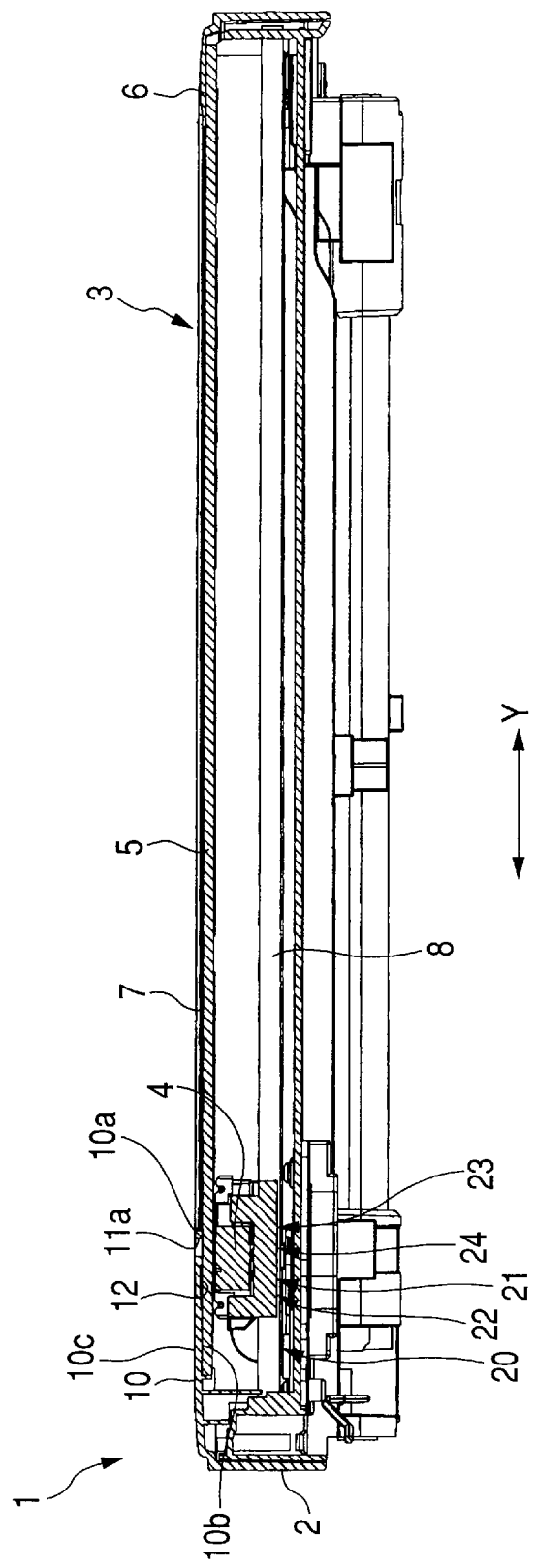
FIG. 3 is a sectional view taken on line III-III of FIG. 2.

As shown in FIG. 3, light emission of the light emitting unit 41 includes first light emission (an example of a third operation mode) in a white reference position 21 (an example of a second position), second light emission (an example of a first operation mode) in a mark position 24 (an example of a first position) and reading light emission (an example of a second operation mode) for reading an image in addition to light emission for searching a reference position (HP, home position) 20 used as a reference point of movement in the Y-axis direction.

The image reading apparatus 1 includes the step motor 81, so that a position of a target in the Y-axis direction of the image reading unit 4 can be reached by calculating the number of steps after emitting light and detecting the reference position 20. In the light emission for searching this reference position 20, light of light sources of three colors of RGB may be emitted in a manner similar to the first light emission and the light emission for reading, but light of one color (for example, green) of RGB may be only emitted. The second light emission will be described below in detail.

The light emission for reading is performed with respect to an image of the document P statically placed on the document placement portion 7 with the record surface set downward while the light emitting unit 41 respectively switches the light sources of RGB at high speed. While this light emission for reading is performed, the image reading unit 4 moves in the Y-axis direction and reads the reflected light by the light receiving unit 42 and thereby, image data is created.

The first light emission is performed in order to acquire correction data (white reference data) for white color. As shown in FIG. 3, a white reference tape 12 (an example of a white colored portion) disposed as a complete white reference is stuck long along the X-axis direction on a back surface 10b which is a surface opposed to the glass plate 5 of the positioning member 10. The white colored portion is not limited to the white reference tape 12 and other configurations such as a paint may be adopted. Then, before reading an image, the image reading unit 4 stops in the white reference position 21 corresponding to the white reference tape 12 and performs light emission (this light emission is described as the first light emission) for acquiring the white reference data and reads the light reflected from the white reference tape 12 by the light receiving unit 42. The first light emission is ended after the white reference data is acquired.

The image reading unit 4 is set so as to stop in plural positions including the reference position 20, the white reference position 21 or the mark position 24 described above (see FIG. 3). The image reading unit 4 after searching the reference position 20 moves to a standby position 22 and stands by the next command.

In addition, in this embodiment, the reference position 20, the standby position 22, the white reference position 21 and the mark position 24 are set in a region of the side of the back surface 10b of the positioning member 10, but these positions are not limited to the sorting order of this embodiment and may be changed properly. For example, the reference position 20 and the standby position 22 may be set in the same position, and the positions vary depending on models of the image reading apparatus.

Figure 2:
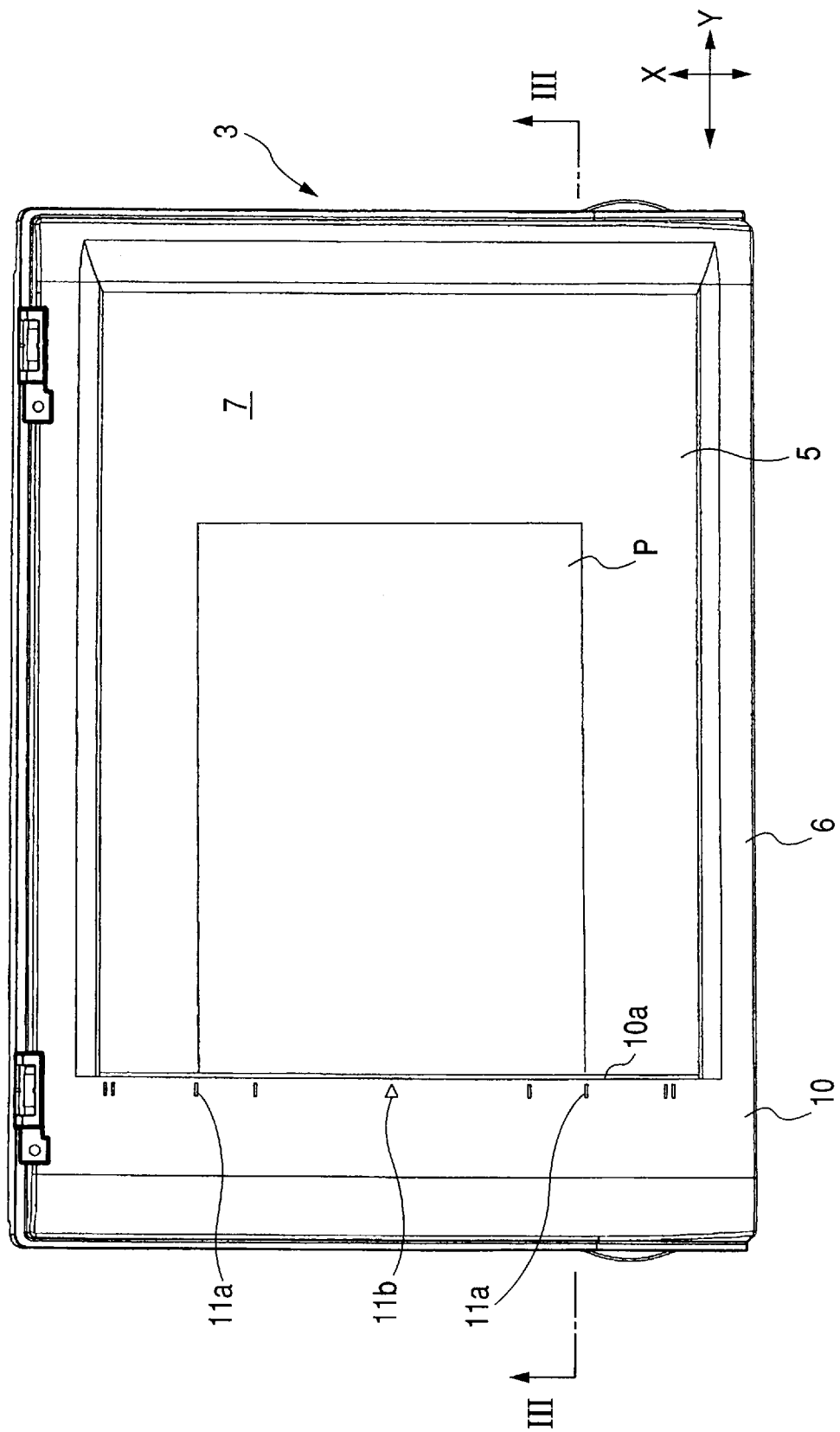
FIG. 2 is a plan view of a state of removing the cover body.

A cover body 9 of the size for covering the whole document placement table 3 is attached to an upper portion of the image reading apparatus 1 freely opened and closed around the back end (upper side of FIG. 2). The opening and closing of the cover body 9 can be detected by an opening and closing sensor (an example of an opening and closing detection unit) 31. As the opening and closing sensor, a sensor of a pressure type is suitable, but other types such as an optical type may be applied.

Also, an operation unit 51 that receives an input, which includes plural keys such as a start key for instructing reading of a document or a power source switch of the image reading apparatus 1, is arranged in an upper surface or a side surface of the image reading apparatus 1. In addition, the image reading apparatus 1 may be connected to an external device such as a personal computer and the image reading apparatus 1 via the interfaces 61, 62, 63 is commanded to operate by a key operation of the external device.

Figure 4A:
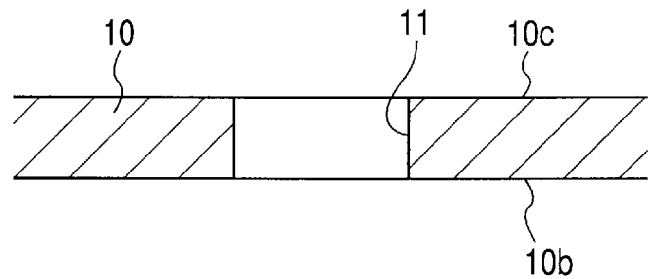
FIG. 4A is a side sectional view of a mark portion.

A mark portion 11 (an example of a display portion and a first portion of the display portion), which is light-transmissive, is disposed in the positioning member 10 for guiding an arrangement position of the document P. In this embodiment, the mark portion 11 includes a hole extend through a front surface 10c and a back surface 10b of the positioning member 10 as shown in FIG. 4A.

The mark portion 11 is used for positioning of the X-axis direction of the document P, and end mark portions 11a for indicating positions of two sides parallel to the Y-axis direction of the document P are disposed in pairs. Plural pairs of the end mark portions 11a are disposed so that plural sizes of documents (for A4, B5, B4, postcard, letter size, etc.) can be aligned with the document placement portion 7. The end mark portion 11a is bored so as to show a rectangular shape elongated in the Y-axis direction when viewed from the plane.

Also, a center mark portion 11b for indicating a center position of the document P is disposed in the mark portion 11. The center mark portion 11b is bored so as to show a triangular shape directed to the side of the document placement portion 7 when viewed from the plane.

Since the mark portion 11 is bored in the positioning member 10 as described above, light of the image reading unit 4 can be transmitted toward the front surface side of the positioning member 10 through the mark portion 11 when the image reading unit 4 stops in the position (mark position 24) of the back surface side of the mark portion 11 and emits light. Consequently, a user can see the mark portion 11 as if the mark portion 11 emits light, when viewed from the front surface side. Light emission for illuminating the mark portion 11 performed by the image reading unit 4 in this mark position 24 is described as the second light emission (an example of a first operation).

In this embodiment, the CIS is adopted as the image reading unit 4, so that the light emitting unit 41 includes a light source of LEDs of three colors of R, G and B. Therefore, the second light emission can be set at red color (red), green color (green), blue color (blue) or colors obtained by arbitrarily combining these three colors as well as white color. Also, blinking light emission or light emission while switching different colors can be performed as well as continuous light emission. Therefore, the second light emission can be freely set according to user's preference when the CIS is adopted as the image reading unit 4. That is, the settings such as color or pattern (e.g., blinking) of the light during the second light emission is changeable in accordance with the input from the operation unit 51, and the settings are stored in the flash memory 74. In addition, when CCD (Charge Coupled Devices) are adopted as the image reading unit 4, a light source of the light emitting unit 41 is only white, so that color cannot be freely set in the second light emission.

The second light emission is used in the case of aligning the document P with the document placement portion 7, so that the second light emission is ended when closing of the cover body 9 is detected by the opening and closing detection unit.

The end mark portions 11a and the center mark portion 11b disposed as the mark portion 11 are scattered along a longitudinal direction of the positioning member 10 and are used for positioning of the document P, so that the mark portions are normally present within the same dimension as a length of the X-axis direction in a reading region of the document. In other words, all the mark portions 11 are present within the same length dimension as a length of the X-axis direction of the image reading unit 4. Therefore, when the image reading unit 4 emits light in the mark position 24, all the mark portions 11 can be illuminated simultaneously. That is, it is unnecessary to dispose a light source every mark portion 11, and light of the image reading unit 4 which is a common light source is only emitted.

Also, in order to clearly indicate a correspondence of each of mark portions 11a and each of positions of document sizes, shapes of characters such as "A4" or "postcard" may be bored in the positioning member 10 and illuminated. Of course, these characters may be only printed or inscribed on the front surface 10c of the positioning member 10.

Figure 4B:
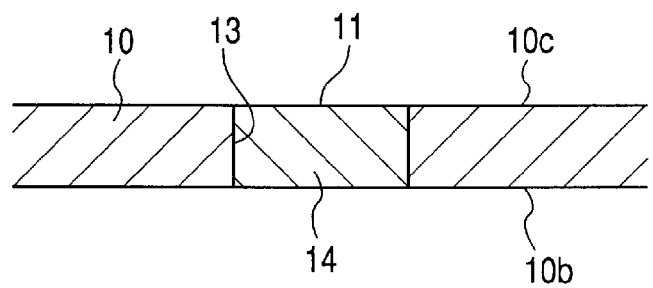
FIGS. 4B to 4D are side sectional views of modified examples of mark portions.
Figure 4C:
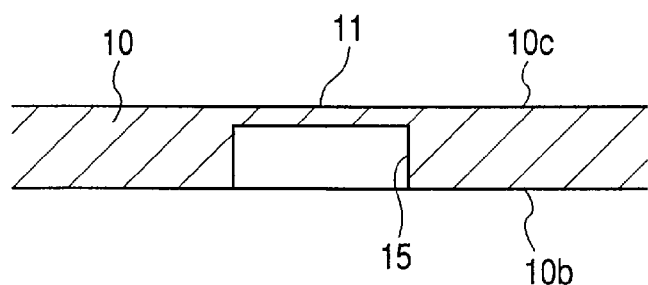
Figure 4D:
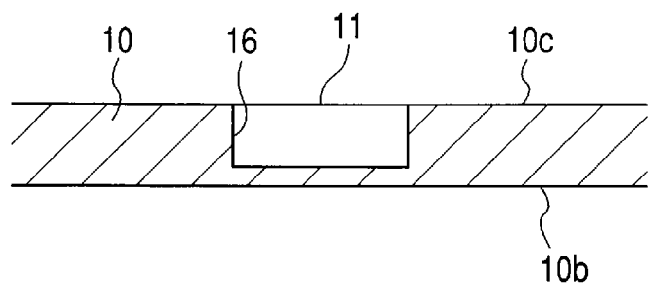

In addition to the mark portion 11 simply including the hole shown in FIG. 4A, as shown in FIG. 4B, the mark portion 11 may include a transmissive member 14 (light transmissive material such as resin material) buried in a through portion 13 formed by a hole formed in the positioning member 10. Also, as shown in FIGS. 4C and 4D, a recessed portion 15 may be formed in the position of the mark portion 11 in the positioning member 10 from the side of the back surface 10b (FIG. 4C), or a plate thickness may be thinned by forming a recessed portion 16 from the side of the front surface 10c (FIG. 4D). The configuration of FIG. 4B or FIG. 4C has an advantage capable of preventing a foreign substance such as wastes from entering the mark portion 11. In addition, the mark portion 11 may be formed as a notch formed in the positioning member 10 at a region contiguous to the document placement portion 7.

An operation of the image reading apparatus 1 will be described using a flowchart of FIG. 5. When a power source of the image reading apparatus 1 is turned on, the light emitting unit 41 of the image reading unit 4 emits light (S101), then the reference position 20 is searched (S102) and then the light is turned off (S103). Then, the image reading unit 4 moves to the standby position 22 in a state of turning off the light and wait a command of an operation at the standby position (S104).

When the cover body 9 is opened by a user and this opening operation is detected by the opening and closing detection unit (Yes in S105), the image reading unit 4 moves to the white reference position 21 by assuming that it is an operation in which the user attempts to read an image from now on (S106). In the white reference position 21, the image reading unit 4 performs the first light emission and acquires white reference data (S107). The first light emission is ended after the data is acquired (S108).

After the white reference data is acquired, the image reading unit 4 moves to the mark position 24 in a state of turning off the light (S109) and then performs the second light emission (S110). Consequently, the end mark portions 11a and the center mark portion 11b disposed in the positioning member 10 are simultaneously illuminated. As a result of that, the user can easily grasp a proper placement position of the document P regardless of the surrounding luminance at a time of placing the document P on the document placement portion 7.

When the placement of the document P on the document placement portion 7 is completed and the opening and closing detection unit detects the close of the cover body 9 (Yes in S111), the image reading unit 4 ends the second light emission (S112) and moves to a reading start position 23 in a state of turning off the light (S113). Then, when a start key of image reading is depressed (Yes in S114), the image reading unit 4 performs the light emission for reading (S115) and starts reading of the document (S116). The image reading unit 4 moves along the Y-axis direction and to the end of a reading region and ends reading (S117). After reading is ended, the reference position 20 is again searched in a state of emitting light (S102) and the reference position 20 is reset. By resetting the reference position 20 after reading thus, the reference position 20 is prevented from deviating.

The document may be read in a state where the cover body 9 is not closed after the document is set on the document placement portion 7 by being guided to the mark portion 11 that is shining brightly. That is, when the start key is depressed (Yes in S118) without closing the cover body 9 (No in S111), the image reading unit 4 moves to the reading start position 23 in a state of opening the cover body (S119), performs the light emission for reading (S115) and reads the document (S116) in a manner similar to the above.

Also, there are cases where the start key is not depressed for a long time (No in S114) even when the document. P is placed on the document placement portion 7 and the cover body 9 is closed (Yes in S111). For example, there are cases where the document P is set on the document placement portion 7 and a user leaves its place in a state of closing the cover body and the document P is left. In such cases, when a preset predetermined time T has elapsed (Yes in S120), the image reading unit 4 emits light of the light emitting unit 41 (S121) and searches the reference position 20 (S102) and turns off the light (S103) and then moves to the standby position 22 and stands by (S104).

Also, there are cases where the start key is depressed (Yes in S122) without opening the cover body 9 (No in S105) regardless of the presence or absence of setting of the document. For example, there are cases where a user returns and presses the start key after the image reading unit 4 moves to the standby position 22 because a long time (predetermined time T or longer) has elapsed in a state of setting the document as described above. In such cases, in order to newly acquire white reference data, the image reading unit 4 moves to the white reference position 21 (S123) and performs the first light emission and acquires the white reference data (S124) and ends the first light emission (S125). Then, the image reading unit 4 moves to the reading start position 23 (S126) and performs the light emission for reading (S115) and reads the document (S116) in a manner similar to the above.

Thus, according to the embodiment, the mark portion 11 is illuminated when a user sets the document P on the document placement portion 7, so that the user can speedily find a proper placement position of the document regardless of the environment of the surrounding luminance.

Also, this image reading unit 4 is essentially used for reading of an image, so that it is unnecessary to provide an additional light source separately as the light source of the mark portion 11, and cost reduction and space saving can be achieved.

Also, even when plural (multiple) mark portions 11 are disposed in the positioning member 10, the image reading unit 4 has about the same dimension as a dimension of a longitudinal direction where the mark portions are disposed, so that the plural (multiple) mark portions 11 can be simultaneously illuminated by one image reading unit 4.

Further, according to the embodiment, the open of the cover body is detected, then the image reading unit 4 is moved to the mark position 24 and then the mark portion 11 is illuminated. Since the image reading unit 4 is essentially used for reading of an image, the image reading unit 4 does not necessarily stand by in the mark position 24 in a normal state. However, an operation in which a user opens the cover body 9 is recognized as an operation in which the user will set the document P, so that the image reading unit 4 speedily moves to the mark position 24 and the mark portion 11 can be illuminated with appropriate timing when the document is set.

Figure 5:
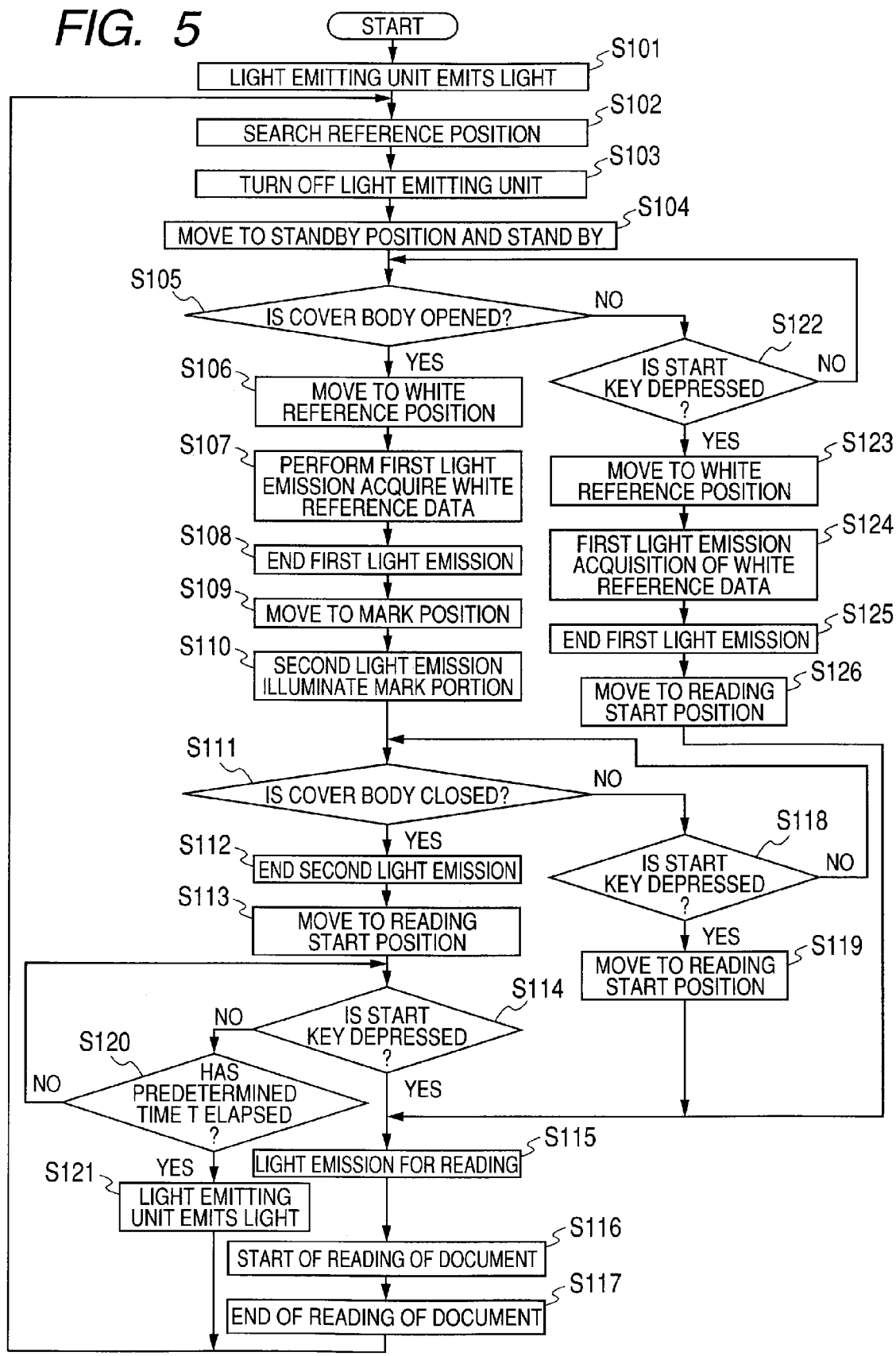
FIG. 5 is a flowchart showing an operation of an image reading unit.
Figure 6:
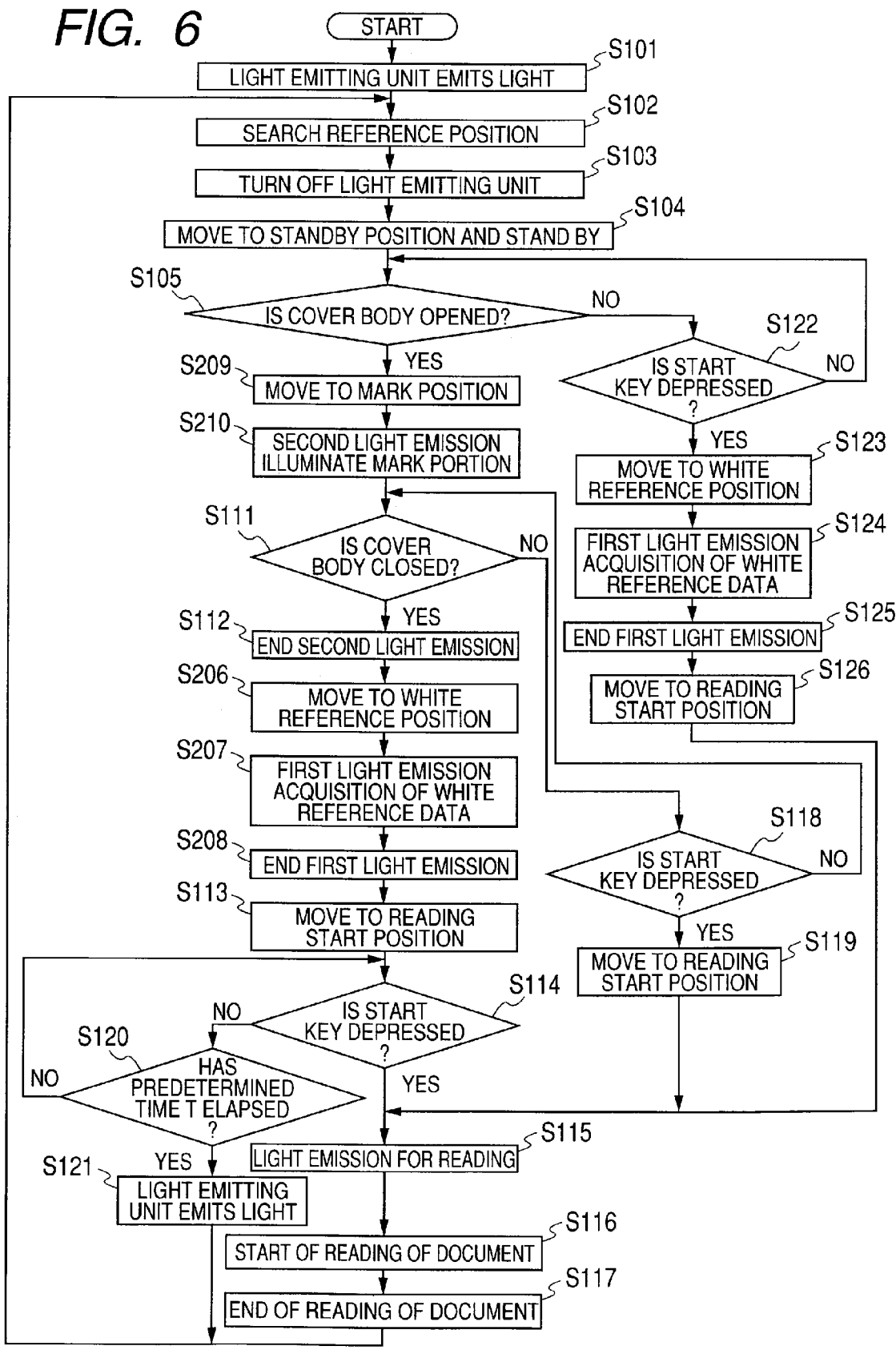
FIG. 6 is a modified example of an operation of an image reading unit.
Figure 7:
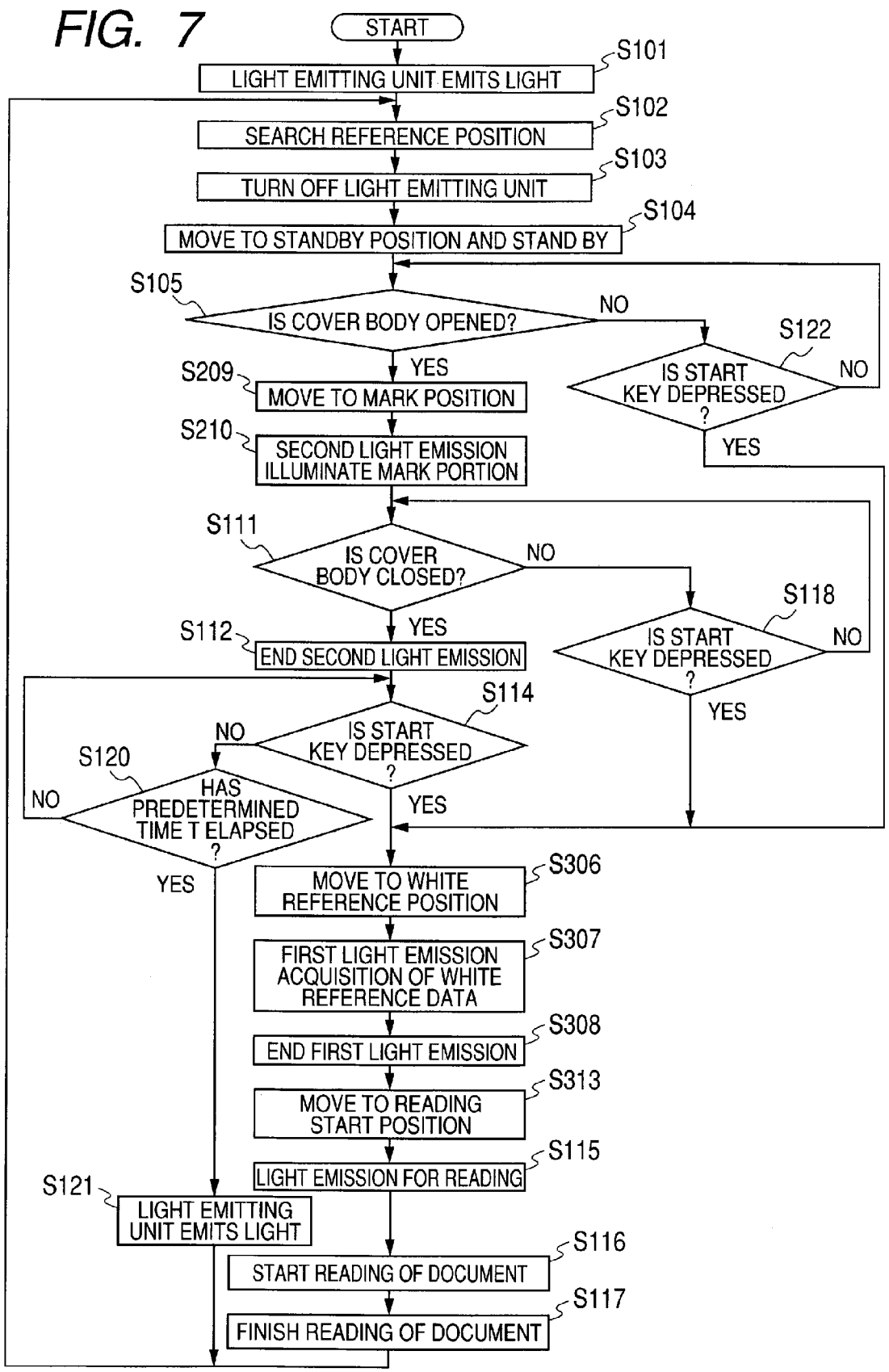
FIG. 7 is another modified example of an operation of an image reading unit.

In addition, the flowchart shown in FIG. 5 can be properly changed without departing from the scope of the invention. For example, a series of operations for acquiring white reference data may be executed at timing different from that of the flowchart shown in FIG. 5. FIGS. 6 and 7 show modified examples of the flowchart shown in FIG. 5. In addition, the same numerals are assigned to the same operations as those of FIG. 5 and detailed description is omitted.

In a flowchart of FIG. 6, after the cover body 9 is opened (Yes in S105), the image reading unit 4 located in the standby position 22 is immediately moved to the mark position 24 (S209) and the second light emission is performed toward the mark portion 11 (S210) and the mark portion 11 is illuminated. Then, after the cover body 9 is closed (Yes in S111) and the second light emission is ended (S112), the image reading unit 4 is moved to the white reference position 21 (S206) and the first light emission is performed and the white reference data is acquired (S207) and then the first light emission is ended (S208).

Consequently, as compared with the flowchart shown in FIG. 5, time taken to illuminate the mark portion 11 after the cover body 9 is opened can be reduced and convenience of a user is improved.

A flowchart of FIG. 7 further modifies the flowchart of FIG. 6, and according to the process shown in FIG. 7, the white reference data is created after a start key is pressed. That is, when the start key is depressed (Yes in S114 or Yes in S118 or Yes in S122), the image reading unit 4 is moved to the white reference position 21 (S306) and the first light emission is performed, the white reference data is acquired (S307) and then the first light emission is ended (S308). Thereafter, the image reading unit 4 immediately moves to the reading start position 23 (S313) and an image is read.

In this case, the white reference data can be acquired in a state of closing the cover body 9 except when the start key is depressed in a state of opening the cover body 9 (Yes in S118). Therefore, influence of outside light is not suffered at the time of acquiring the white reference data, which leads to an advantage capable of acquiring the white reference data with high accuracy.

In addition, in the flowcharts of FIGS. 5 to 7, the case where the CIS which is the image reading unit 4 is turned off except for the durations of the light emission for searching the reference position 20, the first light emission, the second light emission and the light emission for reading has been described. However, when a power source of the image reading apparatus 1 is turned on, the CIS may always emit light and be switched to light emission for searching the reference position, the first light emission, the second light emission and the light emission for reading according to situations. When the image reading unit 4 includes a CCD, it is desirable to always emit light from the standpoint of power consumption or durability (life) of the CCD.

Also, the invention may be applied to an embodiment in which an ADF (automatic paper feeder) is added to an image reading apparatus of a flat bed type, as well as the embodiment of the image reading apparatus 1 of the flat bed type as shown in the drawings.

In the above embodiments, the positioning member 10 is exemplified as the second portion of the display portion, and the mark portion 11 of which has higher transmittance than the positioning member 10 is exemplified as the first portion of the first portion. However, the display portion may include any configuration transmissive of the light emitted from the light emitting unit 41 of the image reading unit 4 that is movable along the first direction (sub-scanning direction) and is positioned at the position corresponding to the display portion.

In addition, the positioning member 10 may have higher transmittance than the mark portion 11. For example, the positioning member 10 (frame body 6) may be formed of a transmissive member, and the mark portion 11 may be printed on the frame body 6.

The first and second portions (e.g., the positioning member 10 and the mark portion 11) of the display portion have different transmittance. However, the first and second portions may have different light transmission characteristics such as different transmittances or different transmissive wavelengths.

In the above embodiments, the mark portion 11 and the positioning member 10 is exemplified as the first and second portions, respectively. However, the display portion may be other configurations. For example, the display portion may be realized by any combination of the first and second portions having different light transmission characteristics, and the first portion may be text, pattern, figure etc. Also, the display portion may include a display device such as LCD using the light from the light emitting unit 41 as a backlight.

According to the embodiment of the invention, the image reading unit having the light emitting unit for emitting light to the document is disposed movably along a back surface of the document placement portion and a back surface of a positioning member and also, a light-transmissive mark portion of the positioning member is disposed. Consequently, when the image reading unit is positioned to the back surface side of the mark portion and emits light, its light is transmitted toward the front surface side of the positioning member through the mark portion, and the mark portion looks bright to a user who attempts to place a document on the document placement portion. Therefore, even when environment of the periphery is bright or dark, the mark portion is easy to recognize and the user can easily arrange a document in a proper position of the document placement portion.

Also, the image reading unit essentially used for reading of a document is utilized as a light source for illuminating the mark portion. That is, an additional light source for the mark portion is not added, so that an increase in cost can be avoided and it is also unnecessary to separately dispose arrangement space of a light source for addition.

Further, when the opening and closing detection unit detects opening of a cover body, the control unit moves the image reading unit to the back surface side of a mark portion and makes the image reading unit emit light for the mark portion. Since an image reading apparatus is disposed for reading of a document, the image reading apparatus is not always positioned to the back surface side of the mark portion. As a result of that, it is decided that opening of the cover body is an operation in which a user will place a document on a document placement portion, and the image reading unit is speedily moved to the back surface side of the mark portion, so that the mark portion can be illuminated with good timing when the user places the document.

Furthermore, since it can be decided that an operation in which the user closes the cover body indicates the end of placement of the document on a document placement portion by the user, light emission for a mark portion of the image reading unit is stopped when the opening and closing detection unit detects closing of the cover body. Consequently, the light emission for the mark portion is prevented from being performed more than necessary.

Still further, the positioning member is formed along the first side of a document placement portion, and a plurality of mark portions are disposed along a longitudinal direction of this positioning member. That is, the plural mark portions are disposed along the longitudinal direction of the positioning member and the image reading unit has substantially the same length as that of the first side, so that the plural mark portions disposed in the positioning member can be simultaneously illuminated by one image reading unit.

Furthermore, since blinking or change in color of light emission for a mark portion can be set, the setting can be made according to user's preference. For example, when the CIS (Contact Image Sensor) is adopted the image reading unit, the light emitting unit includes an LED light source of R (red), G (green) and B (blue), so that light emission color or light emission time can be adjusted easily.

When the mark portion is formed so as to extend through front and back surfaces of a positioning member, it has advantages of having high transmittance in addition to easy processing.

When the mark portion is formed by burying the transmissive member in the hole formed so as to extend through front and back surfaces of a positioning member, it has advantages that wastes etc. are resistant to entering the hole though transmittance is lower than the mark portion with only the hole.

When the mark portion is formed by thinning a plate thickness of a positioning member, it has advantages that wastes etc. are resistant to entering a through portion though transmittance is lower than the mark portion with only the hole.

What is claimed is:

1. An image reading apparatus comprising:
   a document placement portion on which a document is allowed to be placed;
   a display portion, at least a part of which is transmissive of light;
   an image reading unit movable along a first direction below the document placement portion and comprising a light emitting unit comprising a red light source, a green light source, and a blue light source, configured to emit light; and a control unit operable to control the image reading unit in a plurality of operation modes, wherein the plurality of operation modes include a first operation mode that allows the image reading unit to be positioned at a first position corresponding to the display portion and causes the light emitting unit to emit the light from at least one of the red light source, the green light source, and the blue light source, the display portion being transmissive of the light emitted from the light emitting unit at the first position, wherein the image reading unit further comprises a light receiving unit, wherein the plurality of operation modes include a second operation mode that allows the control unit to activate the light emitting unit to emit light from all of the red light source, the green light source, and the blue light source and the light receiving unit and to move the image reading unit to perform an image reading operation, wherein the at least one color of light emitted from the light emitting unit in the first operation mode is different from the colors of light emitted from the light emitting unit in the second operation mode, such that the display portion is colored in a color made by the at least one color of the light emitted from the light emitting unit, and wherein, when in the first operation mode, two of the red light source, the green light source, and the blue light source are turned on to create a color that is different from the color in the second operation mode.

2. The image reading apparatus according to claim 1, further comprising:

a cover body configured to cover the front surface of the document placement portion at a closed position and movable to an opened position that exposes the document placement portion; and an opening and closing detection unit configured to detect the position of the cover body, wherein, when the opening and closing detection unit detects the opened position of the cover body, the control unit allows the image reading unit to perform the first operation mode.

3. The image reading apparatus according to claim 2, wherein the control unit stops the first operation mode when the opening and closing detection unit detects the closed position of the cover body.

4. The image reading apparatus according to claim 1, wherein the image reading unit extends along a second direction perpendicular to the first direction, and wherein the document placement portion has a rectangular shape extending along the first and second directions.

5. The image reading apparatus according to claim 1, wherein the control unit controls at least one of a pattern of the light emitted from the light emitting unit during the first operation mode according to a setting that is changeable.

6. The imager reading apparatus according to claim 1, wherein the display portion comprises: a first portion having a first light transmission characteristic; and a second portion having a second light transmission characteristic different than the first light transmission characteristic.

7. The image reading apparatus according to claim 6, wherein the first display portion has a first light transmittance as the first light transmission characteristic, and the second display portion has a second light transmittance as the second light transmission characteristic different than the first light transmittance.

8. The image reading apparatus according to claim 7, wherein the first display portion is transmissive of the light, and the second display portion is substantially opaque.

9. The image reading apparatus according to claim 6, wherein the first display portion is transmissive of light having a first wavelength, and the second display portion is transmissive of light having a second wavelength.

10. The image reading apparatus according to claim 1, wherein the display portion is disposed adjacent to the document placement portion.

11. The image reading apparatus according to claim 1, further comprising a positioning portion provided between the document placement portion and the display portion as a reference to guide the document to be placed on the document placement portion.

12. The image reading apparatus according to claim 11, wherein the display portion comprises: a first portion having a first light transmission characteristic; and a second portion having a second light transmission characteristic different than the first light transmission characteristic, wherein a mark portion is provided as the first portion in a vicinity of the positioning portion at a position corresponding to a reference position of the document to be placed on the document placement portion.

13. The image reading apparatus according to claim 12, wherein the image reading unit extends along a second direction perpendicular to the first direction, and wherein the document placement portion has a rectangular shape extending along the first and the second directions, the rectangular shape including a first side that is in parallel with the second direction, wherein the positioning portion is formed along an entire length of the first side of the document placement portion, and wherein a plurality of the mark portions are arranged along the first side and within the entire length of the first side.

14. The image reading apparatus according to claim 12, wherein the mark portion includes a hole formed in the second display portion.

15. The image reading apparatus according to claim 14, wherein the mark portion includes a transmissive member buried in the hole.

16. The image reading apparatus according to claim 12, wherein the second display portion has a second thickness, and the mark portion has a first thickness smaller than the second thickness.

17. The image reading apparatus according to claim 11, wherein the positioning portion protrudes from a document placement surface of the document placement portion.

18. The image reading apparatus according to claim 17, comprising:

a document placement table including a transparent member; and a plate member disposed on the transparent member, wherein the document placement portion is defined on an area of the transparent member except the plate member, and wherein the positioning portion is defined at a boundary of the plate member and the document placement portion.

19. The image reading apparatus according to claim 18, wherein the plate member includes a white colored portion on a first surface that is opposed to the transparent member, wherein the plurality of operation modes include a third operation mode that allows the control unit to move the image reading unit to a second position that is opposed to the white colored portion and to activate the light emitting unit and the light receiving unit to perform a correction operation for a color of an image reading operation.

20. The image reading apparatus according to claim 1, further comprising an operation unit configured to accept an input for changing the at least one color of light emitted from the light emitting unit in the first operation mode.

* * * * *